United States Patent
Mills et al.

(10) Patent No.: US 9,455,107 B2
(45) Date of Patent: Sep. 27, 2016

(54) ELECTRICAL SWITCHING APPARATUS INCLUDING A REMOTELY CONTROLLABLE ACTUATOR STRUCTURED TO MOVE A PUSH/PULL OPERATING HANDLE

(71) Applicant: Labinal, LLC, Denton, TX (US)

(72) Inventors: Patrick Wellington Mills, Bradenton, FL (US); James Michael McCormick, Bradenton, FL (US)

(73) Assignee: LABINAL, LLC, Denton, TX (US)

( * ) Notice: Subject to any disclaimer, the term of this patent is extended or adjusted under 35 U.S.C. 154(b) by 0 days.

(21) Appl. No.: 14/557,529

(22) Filed: Dec. 2, 2014

(65) Prior Publication Data

US 2015/0155124 A1 Jun. 4, 2015

Related U.S. Application Data

(60) Provisional application No. 61/911,199, filed on Dec. 3, 2013.

(51) Int. Cl.
| | |
|---|---|
| H01H 9/00 | (2006.01) |
| H01H 50/32 | (2006.01) |
| H01H 50/02 | (2006.01) |
| H01H 50/64 | (2006.01) |
| H01H 50/54 | (2006.01) |
| H01H 51/30 | (2006.01) |
| H01H 89/00 | (2006.01) |
| H01H 71/12 | (2006.01) |
| H01H 71/68 | (2006.01) |
| H01H 89/08 | (2006.01) |
| H02B 1/056 | (2006.01) |

(52) U.S. Cl.
CPC ........... H01H 50/326 (2013.01); H01H 50/02 (2013.01); H01H 50/54 (2013.01); H01H 50/641 (2013.01); H01H 51/30 (2013.01); H01H 71/12 (2013.01); H01H 71/68 (2013.01); H01H 89/00 (2013.01); H01H 89/08 (2013.01); H02B 1/056 (2013.01)

(58) Field of Classification Search
CPC ...... H01H 71/12; H01H 71/68; H01H 89/08; H01H 89/00; H01H 50/02; H01H 50/641; H01H 50/54; H01H 51/30; H01H 50/326; H02B 1/056
See application file for complete search history.

(56) References Cited

U.S. PATENT DOCUMENTS

| | | | |
|---|---|---|---|
| 4,317,094 | A | 2/1982 | Peterson |
| 7,170,376 | B2 | 1/2007 | Mills et al. |
| 7,280,337 | B2 | 10/2007 | Engel |
| 7,570,146 | B2 | 8/2009 | Mills et al. |
| 8,094,436 | B2 | 1/2012 | Mills et al. |
| 2009/0027154 | A1 | 1/2009 | Mills |
| 2011/0235244 | A1 | 9/2011 | Mills |
| 2013/0242450 | A1 | 9/2013 | Mills |

OTHER PUBLICATIONS

International Search Report filed in PCT/US2014/068016 mailed Feb. 19, 2015.

Primary Examiner — Bernard Rojas
(74) Attorney, Agent, or Firm — Rankin, Hill & Clark LLP (57) ABSTRACT

An electrical switching apparatus includes a housing, separable contacts within the housing, and an operating mechanism structured to open and close the separable contacts. The operating mechanism includes a push/pull operating handle and a remotely controllable actuator. The electrical switching apparatus also includes a trip mechanism cooperating with the operating mechanism to trip open the separable contacts in response to a trip condition or remotely open the separable contacts when closed. The remotely controllable actuator is structured to move the push/pull operating handle in order to remotely close the separable contacts when opened or remotely reset the separable contacts when tripped open.

20 Claims, 5 Drawing Sheets

ELECTRICAL SWITCHING APPARATUS INCLUDING A REMOTELY CONTROLLABLE ACTUATOR STRUCTURED TO MOVE A PUSH/PULL OPERATING HANDLE

BACKGROUND

1. Field

The disclosed concept pertains generally to electrical switching apparatus and, more particularly, to remotely controllable apparatus, such as, for example, a remotely controllable circuit breaker. The disclosed concept further pertains to systems including electrical switching apparatus.

2. Background Information

Circuit breakers are used to protect electrical circuitry from damage due to an overcurrent condition, such as an overload condition or a relatively high level short circuit or fault condition. In small circuit breakers, commonly referred to as miniature circuit breakers, used for residential and light commercial applications, such protection is typically provided by a thermal-magnetic trip device. This trip device includes a bimetal, which heats and bends in response to a persistent overcurrent condition. The bimetal, in turn, unlatches a spring powered operating mechanism, which opens the separable contacts of the circuit breaker to interrupt current flow in the protected power system.

Subminiature circuit breakers are used, for example, in aircraft or aerospace electrical systems where they not only provide overcurrent protection but also serve as switches for turning equipment on and off. As such, they are subjected to heavy use and, therefore, must be capable of performing reliably over many operating cycles. They also must be small to accommodate the high-density layout of circuit breaker panels, which make circuit breakers for numerous circuits accessible to a user. Aircraft electrical systems usually consist of hundreds of circuit breakers, each of which is used for a circuit protection function as well as a circuit disconnection function through a push-pull handle. The push-pull handle is moved from in-to-out in order to open the load circuit. This action may be either manual or, else, automatic in the event of an overload or fault condition. If the push-pull handle is moved from out-to-in, then the load circuit is re-energized. If the load circuit had been automatically de-energized, then the out-to-in operation of the push-pull handle corresponds to a circuit breaker reset action.

U.S. Pat. No. 7,570,146 discloses a panel mountable aircraft circuit breaker including a housing having an opening, separable contacts, an operating mechanism structured to open and close the contacts, and a trip mechanism structured to cooperate with the operating mechanism to trip open the operating mechanism. The trip mechanism includes a first bimetal to trip open the operating mechanism responsive to a thermal fault, a second ambient compensation bimetal to compensate the first bimetal, and an arc fault trip circuit to trip open the operating mechanism responsive to an arc fault. An indicator includes an indicator portion and a leg disposed from the indicator portion. A spring biases the indicator portion. The second bimetal holds the leg of the indicator, thereby holding the indicator against the spring bias. The second bimetal releases the leg of the indicator responsive to the arc fault trip circuit and the arc fault, thereby releasing the indicator to the spring bias.

U.S. Pat. No. 8,094,436 discloses a plug-in circuit breaker assembly.

U.S. Pat. No. 7,280,337 discloses a controllable circuit breaker comprising: a housing; a first input adapted to receive an external close signal; a second input adapted to receive an external open signal; a third input adapted to receive a control voltage; a set of main contacts; an operating mechanism for opening and closing the set of main contacts; a set of secondary contacts connected in series with the set of main contacts; a latching solenoid including a plunger latchable to a first position which closes the set of secondary contacts and to a second position which opens the set of secondary contacts, a first coil which when energized operates the plunger to the first position and a second coil which when energized operates the plunger to the second position, the first and second coils having a common node which is electrically connected to the third input; and a non-mechanical, electronic control circuit within the housing, the non-mechanical, electronic control circuit adapted to receive the external close and open signals from the first and second inputs and responsively energize the first and second coils, respectively, from the third input for a predetermined time. A non-mechanical, electronic circuit within the circuit breaker housing is adapted to provide a direct current status signal at an output when separable contacts are closed and a first or line terminal is energized with an alternating current voltage. The direct current status signal is representative of a second or load terminal being energized with the alternating current voltage.

There is room for improvement in electrical switching apparatus.

There is also room for improvement in systems including electrical switching apparatus.

SUMMARY

According to one aspect, an electrical switching apparatus includes a housing, separable contacts within the housing, and an operating mechanism structured to open and close the separable contacts. The operating mechanism includes a push/pull operating handle and a remotely controllable actuator. The electrical switching apparatus also includes a trip mechanism cooperating with the operating mechanism to trip open the separable contacts in response to a trip condition or remotely open the separable contacts when closed. The remotely controllable actuator is structured to move the push/pull operating handle in order to remotely close the separable contacts when opened or remotely reset the separable contacts when tripped open.

According to another aspect, a plural-phase system includes a plurality of electrical switching apparatus. Each of the electrical switching apparatus includes a housing, separable contacts within the housing, and an operating mechanism structured to open and close the separable contacts. The operating mechanism includes a push/pull operating handle and a remotely controllable actuator including an input for a first remote signal. Each of the electrical switching apparatuse also include a trip mechanism cooperating with the operating mechanism to trip open the separable contacts in response to a trip condition or remotely open the separable contacts when closed, the trip mechanism including an input for a second remote signal. The remotely controllable actuator is structured to move the push/pull operating handle in order to remotely close the separable contacts when opened or remotely reset the separable contacts when tripped open. The plural-phase system also includes a remote control mechanism structured to output for each of the electrical switching apparatus, the first remote signal to the input of the remotely controllable actuator and the second remote signal to the input of the trip mechanism.

According to another aspect, a system includes a power distribution unit or circuit breaker panel, and an electrical switching apparatus. The electrical switching apparatus includes a housing, separable contacts within the housing, and an operating mechanism structured to open and close the separable contacts. The operating mechanism includes a push/pull operating handle and a remotely controllable actuator. The electrical switching apparatus also includes a trip mechanism cooperating with the operating mechanism to trip open the separable contacts in response to a trip condition or remotely open the separable contacts when closed. The remotely controllable actuator is structured to move the push/pull operating handle in order to remotely close the separable contacts when opened or remotely reset the separable contacts when tripped open. The electrical switching apparatus is a switching contactor for the power distribution unit or a master open/close device for the circuit breaker panel.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the term "processor" shah mean a programmable analog and/or digital device that can store, retrieve, and process data; a computer; a workstation; a personal computer; a controller; a digital signal processor; a microprocessor; a microcontroller; a microcomputer; a central processing unit; a mainframe computer; a mini-computer; a server; a networked processor; or any suitable processing device or apparatus.

As employed herein, the statement that two or more parts are "connected" or "coupled" together shall mean that the parts are joined together either directly or joined through one or more intermediate parts. Further, as employed herein, the statement that two or more parts are "attached" shall mean that the parts are joined together directly.

As employed herein, the term "thermal fault" shall mean a thermal overload current condition.

The disclosed concept is described in association with a subminiature aircraft or aerospace arc fault circuit breaker, although the disclosed concept is applicable to a wide range of electrical switching apparatus, such as circuit breakers for power circuits.

The disclosed concept provides a thermal/arc fault electrical switching apparatus that can be operated in the following example modes: (1) the apparatus can trip/open on a thermal overload and be reset manually; (2) the apparatus can be remotely opened or closed without the presence of a thermal fault condition or an arc fault condition; (3) the apparatus can detect and trip/open if a thermal fault condition or an arc fault condition is sensed; (4) the apparatus can be manually reset and/or remotely (electrically) reset; and/or (5) the apparatus can indicate if the fault condition was a thermal fault condition or an arc fault condition.

The disclosed apparatus can fit in an existing aircraft circuit breaker envelope (e.g., without limitation, MS3320 (Mil-Spec)) for direct retrofit into existing aircraft panels.

Figure 1:
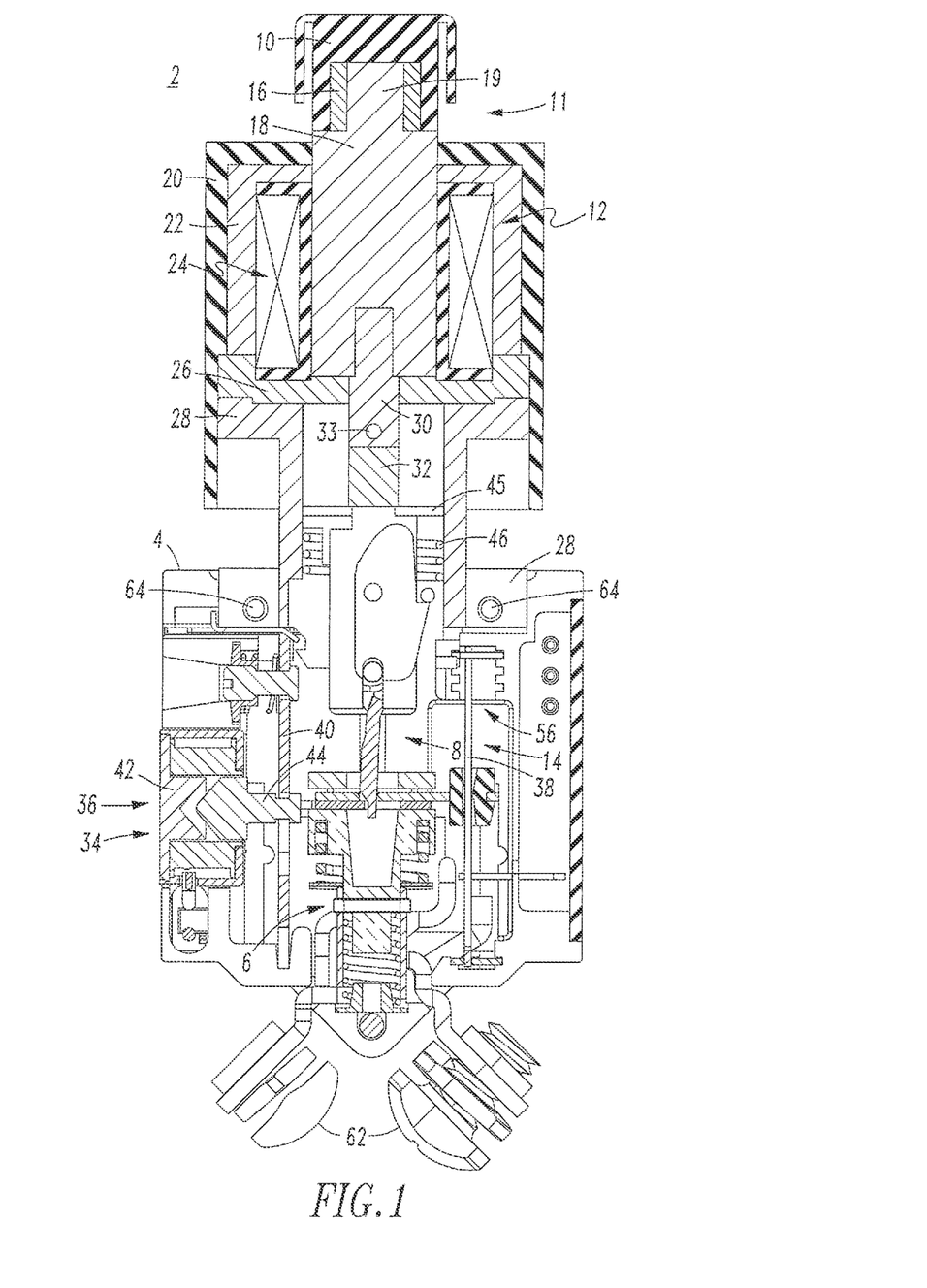
FIG. 1 is a vertical sectional view of a miniature remote control circuit breaker with arc fault protection in accordance with embodiments of the disclosed concept.

Referring to FIG. 1, an electrical switching apparatus, such as the example miniature remote control circuit breaker 2, is shown. The circuit breaker 2 can be, for example and without limitation, a miniature remotely controllable circuit breaker, such as an arc fault circuit breaker, an aircraft arc fault circuit breaker or a miniature remote controlled arc fault circuit breaker. The circuit breaker 2 includes a housing 4, separable contacts 6 within the housing 4, and an operating mechanism 8 structured to open and close the separable contacts 6. The operating mechanism 8 includes a push/pull operating handle 11 formed by the example push button 10, and a remotely controllable actuator, such as the example solenoid 12. A trip mechanism 14 cooperates with the operating mechanism 8 to trip open the separable contacts 6 in response to a trip condition (e.g., arc fault; thermal fault) or remotely open the separable contacts 6 when closed. The solenoid 12 is structured to move the push/pull operating handle 11 in order to remotely close the separable contacts 6 when opened or remotely reset the separable contacts 6 when tripped open.

Figure 3:
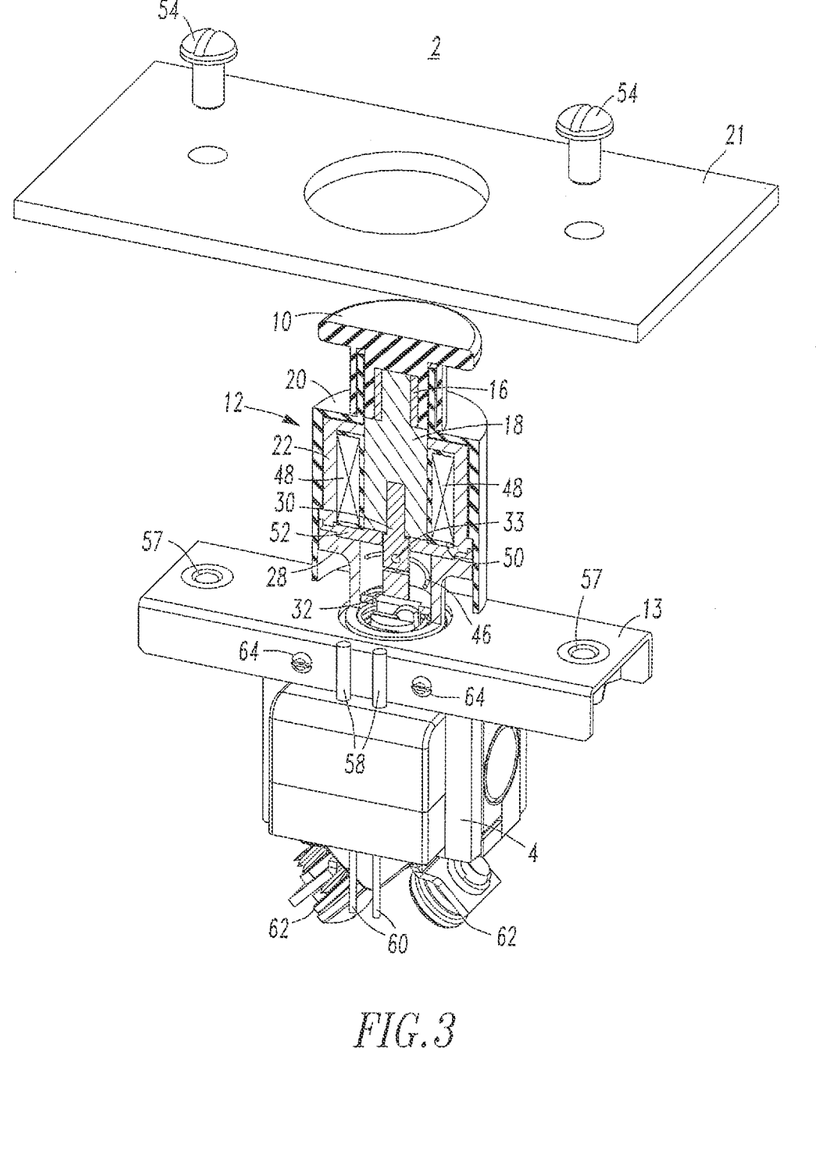
FIG. 3 is a partially exploded isometric sectional view of the miniature remote control circuit breaker of FIG. 1 and a mounting panel in accordance with another embodiment of the disclosed concept.

The solenoid 12 includes an example brass mold insert 16, an armature 18, an enclosure 20, a magnetic circuit 22, a coil and bobbin assembly 24 and a stationary pole 26. The push button 10 is coupled to the brass mold insert 16 for movement therewith upward and downward with respect to FIG. 1). The solenoid armature 18 includes a plunger 19 coupled to the brass mold insert 16 and the push button 10. Hence, a portion of the solenoid 12 extends from the housing 4. As shown in FIG. 3, a panel mounting bracket 13 is coupled to the solenoid 12 and is structured to mount the circuit breaker 2 to a panel 21. A mounting flange 28 is coupled to the housing 4, to the panel mounting bracket 13 and to the solenoid enclosure 20.

Within the solenoid enclosure 20, a connecting rod 30 is coupled to the solenoid armature 18 for movement therewith. A latch carrier 32 is coupled to the connecting rod 30 by a connecting pin 33 for movement with the connecting rod 30 and the solenoid armature 18.

The separable contacts 6, the operating mechanism 8 and the trip mechanism 14 are disclosed by U.S. Pat. Nos. 7,570,146 and 7,170,376, which are incorporated by reference herein. The trip mechanism 14 includes an arc fault trip circuit 34 structured to trip open the operating mechanism 8 responsive to detection of an arc fault. The arc fault trip circuit 34 includes a miniature coil assembly 36 and an arc fault detection circuit (not shown) as disclosed by U.S. Pat.

Nos. 7,570,146 and 7,170,376. The trip mechanism 14 further includes a bimetal 38, which moves responsive to a thermal fault to trip open the operating mechanism 8 independent from the miniature coil assembly 36, which is structured to move an ambient temperature compensation bimetal 40 responsive to detection of an arc fault to trip open the operating mechanism 8. The arc fault detection circuit energizes a trip coil 42 responsive to the arc fault. In turn, a plunger 44 and the ambient temperature compensation bimetal 40 are moved responsive to the coil 42 being energized.

The spring guide 45 provides a bearing surface for the armature return spring 46 to move freely on and to push against to return the armature 18 to the rest position. The armature return spring 46 returns the armature 18 to the open position after the miniature coil assembly 36 trips open the circuit breaker 2. The armature return spring 46 prevents the armature 18 from moving or vibrating when the circuit breaker 2 is in the open position. This addresses the condition of a device that is open but the environment/application is functioning (e.g., without limitation, due to vibration from a functioning aircraft).

The operating mechanism 8 has a first state (shown in FIG. 1) when the separable contacts 6 are closed and a second state (shown in phantom line drawing in FIG. 1) when the separable contacts are open or tripped open. The operating mechanism 8 is structured, when the separable contacts 6 are open or tripped open, to be closed or manually reset from the second state to the first state by the push/pull operating handle 11 being pushed (downward with respect to FIG. 1) toward the solenoid 12. The operating mechanism 8 is further structured to be manually opened by the push/pull operating handle 11 being pulled (upward with respect to FIG. 1) away from the solenoid 12, remotely closed by the solenoid 12 without the presence of the trip condition, or remotely tripped open as will be described.

Figure 2:
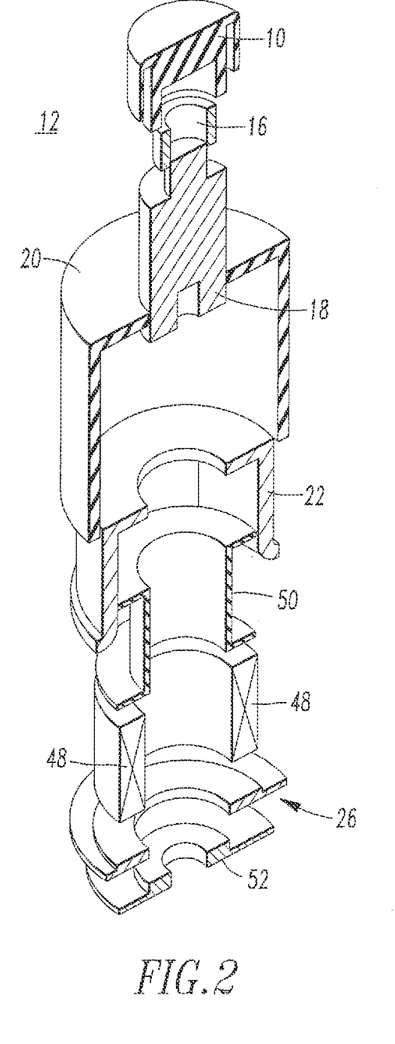
FIG. 2 is an exploded isometric sectional view of a solenoid and a push/pull operating handle of the miniature remote control circuit breaker of FIG. 1.

FIG. 2 shows the solenoid 12 of FIG. 1. The coil and bobbin assembly 24 (FIG. 1) includes a coil 48 and a bobbin 50. The solenoid 12 includes the magnetic circuit 22 (FIG. 1), the stationary pole 26 (FIG. 1) and a bottom plate 52 (FIG. 3).

The trip mechanism 14 includes, for example and without limitation, an arc fault trip mechanism, such as the arc fault trip circuit 34, and a thermal fault trip mechanism 56. The trip mechanism 14 detects a trip condition, such as for example and without limitation, an arc fault condition or a thermal overload fault condition, and causes the operating mechanism 8 to trip open the separable contacts 6 responsive thereto.

FIG. 3 shows the miniature remote control circuit breaker 2 of FIG. 1 and the aircraft mounting panel 21. The circuit breaker 2 includes the mounting bracket 13 coupled to the example solenoid 12.

The mounting bracket 13 is structured to mount the circuit breaker 2 on the panel 21. For example, two fasteners 54 pass through the panel 21 and engage the mounting bracket 13 at threaded openings 57.

Two pins 58 extend vertically upward (with respect to FIG. 3) from the lower (with respect to FIG. 3) mechanical part of the circuit breaker 2. These pins 58 correspond to conductors (not shown) of the coil 48 of the coil and bobbin assembly 24 (FIG. 1) and electronically control "close" operation of the circuit breaker 2 with the solenoid 12. Two relatively smaller pins 60 extend vertically downward (with respect to FIG. 3) from the lower (with respect to FIG. 3) mechanical part of the circuit breaker 2. These pins 60 engage embedded socket connections (not shown) that remotely electronically control the "trip open" operation. A user can grasp the push button 10 in order to manually open or close the circuit breaker 2. Remote closing is the same operation as remote (electrical) resetting.

The circuit breaker 2 employs the mounting bracket 13 to couple to the aircraft mounting panel 21. The example panel mounting bracket 13 (FIG. 3) is fastened to the mounting flange 28 (FIG. 1) by fasteners 64. The mounting flange 28 couples together the solenoid 12 and the mechanical components of the circuit breaker 2. This structure provides the embedded reset solenoid 12 and a pass-thru manual reset function. The separable contacts 6 within the housing 4 are electrically connected between terminals 62.

Alternatively, circuit breaker mounting can be accomplished with a suitable mounting nut (not shown) on the outside of a threaded solenoid housing (not shown). The mounting nut and threaded housing retain the circuit breaker to the aircraft mounting panel 21.

Figure 4:
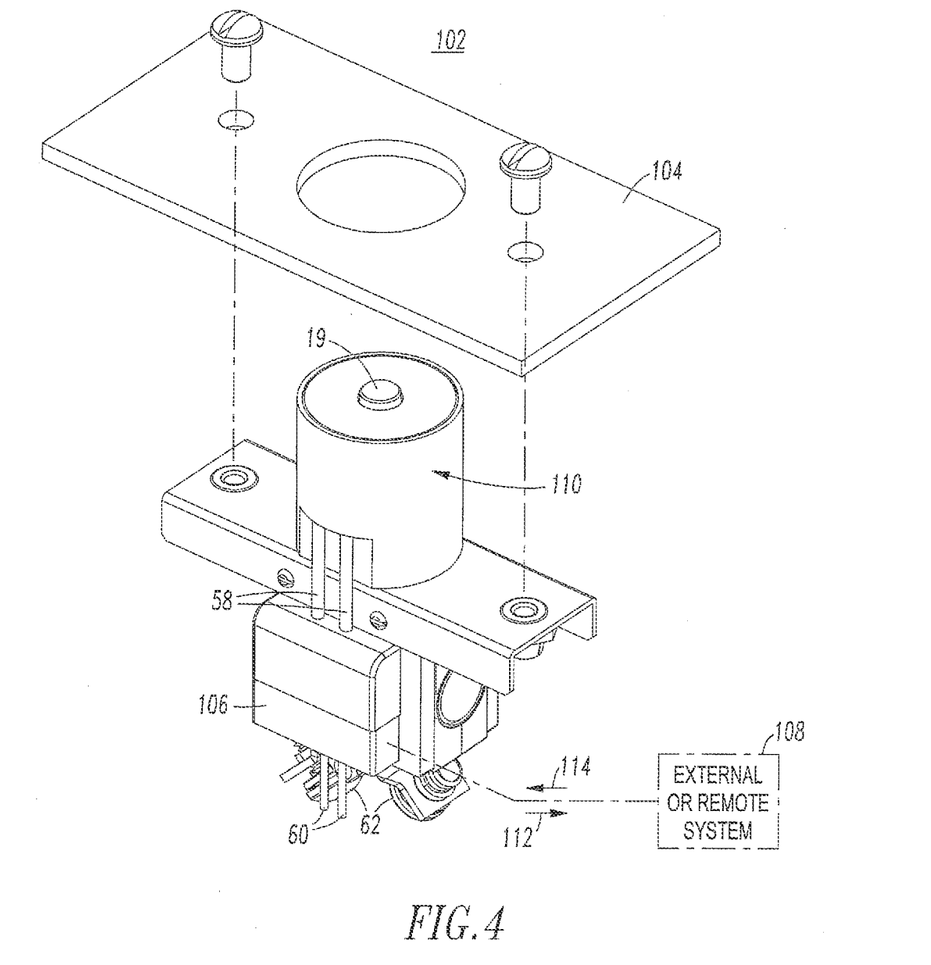
FIG. 4 is a partially exploded isometric view of a miniature remote control circuit breaker and mounting panel in accordance with another embodiment of the disclosed concept.

FIG. 4 shows another miniature remote control circuit breaker 102 and an aircraft mounting panel 104. The circuit breaker 102 is somewhat similar to the circuit breaker 2 (FIG. 1) except that it includes a connector 106 to an external or remote system 108 (shown in phantom line drawing) and does not include the push/pull operating handle 11 (FIG. 1). Also, the solenoid 110 of the circuit breaker 102 is somewhat similar to the solenoid 12 (FIG. 1) except that it does not provide a manual open operation (e.g., manual upward movement with respect to FIG. 4), but can be manually closed or reset (e.g., by a manual downward movement of the solenoid plunger 19 with respect to FIG. 4). The circuit breaker 102 can provide one or more of an arc fault circuit interrupter (AFCI) function, an indicator/control unit (ICU) circuit breaker function (e.g., the ICU provides a discrete signal to a number of other systems for indication), or an electronic control unit (ECU) function (e.g., the ECU provides the ability to remotely open/close the circuit breaker 102 using a control member (e.g., a switch; a relay; a toggle circuit breaker)). For example and without limitation, rather than employing a mechanical indicator to indicate a trip responsive to an arc fault trip condition, the circuit breaker 102 can provide a remote electronic indication to the external or remote system 108 as to whether it is open or closed. The example connector 106 can accept four example conductors (e.g., a line voltage input for closing or resetting the solenoid 110; a ground; an arc fault trip indication output; and a common). The example pins 60 receive an external trip/open command (e.g., without limitation, pulse to trip/open; the arc fault trip circuit 34 and the pins 60 both drive the miniature coil assembly 36).

For example, a processor (not shown) of the arc fault trip circuit 34 outputs an arc fault trip indication output signal 112 using the connector 106 to indicate an arc fault trip condition. A thermal trip is indicated by the main separable contacts 6 (FIG. 1) being open and the absence of the arc fault trip indication output signal 112.

For example, the circuit breaker 102 can provide arc fault protection for a circuit breaker panel, such as 104, including a plurality of circuit breakers (not shown) or for a branch power circuit.

The example circuit breaker 102 permits a plurality of the circuit breakers 102 to be electrically "tagged" or "ganged" together in order to provide plural-phase (e.g., without limitation, three-phase) circuit protection or multi-pole protection. For such a configuration, each of the circuit breakers 102 can protect a corresponding phase (e.g., without limitation, phase A; phase B; phase C) with the connector 106 of each of the circuit breakers 102 being electrically connected to: (1) a corresponding line voltage input 114 for closing or resetting the solenoid 110 for the corresponding one of the three phases A, B or C; (2) a corresponding ground 116; (3) one ganged arc fault trip indication output signal 112; and (4) a corresponding common 118. Also, the example pins 60 receive the external trip/open command for the corresponding one of the three phases A, B or C.

Figure 5:
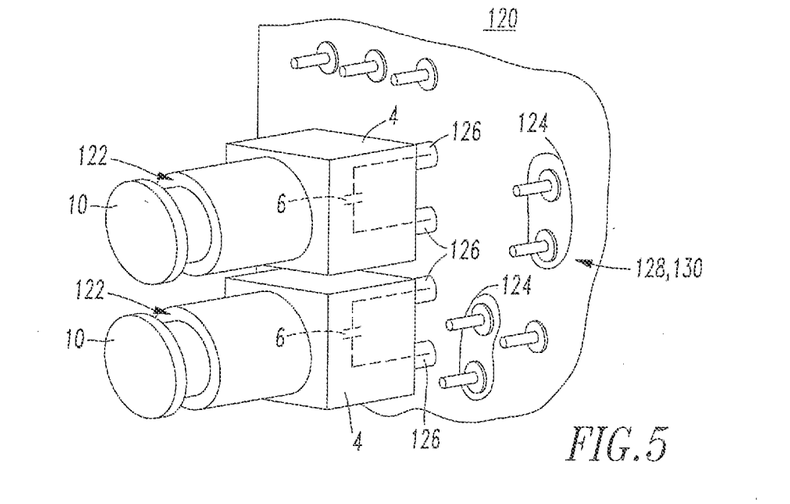
FIGS. 5 and 6 are block diagrams of systems including a plurality of miniature remote control circuit breakers in accordance with other embodiments of the disclosed concept.

FIG. 5 shows a system 120 including a plurality of miniature remote control circuit breakers (RCCBs) 122 and a plurality of corresponding plug-in members 124. As a non-limiting example, rather than having a power contactor (not shown) at a rear of a circuit breaker panel (not shown), one of the plug-in RCCBs 122 can switch master power on/off to the panel. This provides a significant weight, volume, maintainability and cost benefit. For example, the weight of the disclosed RCCB 122 is about 40% to 50% less than that of a conventional MIL-83383 RCCB, with about ¹⁄₁₀th of the corresponding package size. Since the plug-in RCCBs 122 are plug-in devices, they provide for relatively easy replacement and can be populated with other thermal-only plug-in devices. For example and without limitation, the RCCBs 122 include plug-in sockets 126 on the bottom (toward the right with respect to FIG. 5) of the RCCB 122 and the corresponding plug-in members 124 urea plurality of pins 124. Although plug-in RCCBs 122 are shown, the disclosed concept is applicable to RCCBs having any suitable line and load terminations (e.g., without limitation, threaded terminals (not shown)).

Except for the plug-in sockets 126 that replace the terminals 62 of FIG. 3, the RCCB 122 can be similar to the circuit breaker 2 of FIGS. 1-3. The plug-in sockets 126 extend from the housing 128 and the separable contacts 6 (shown in hidden line drawing) are electrically connected between the plug-in sockets 126. The plug-in members 124 of the system 120 can be part of a circuit breaker panel or power distribution unit.

The example system 120 includes a power distribution unit 128 or circuit breaker panel 130, and the plug-in RCCBs 122. Each of the plug-in RCCBs 122 is structured to remotely close the separable contacts 6 when opened, and remotely reset the separable contacts 6 when tripped open. One of the plug-in RCCBs 122 can be a switching contactor for the power distribution unit 128, or a master open/close device for the circuit breaker panel 130.

Figure 6:
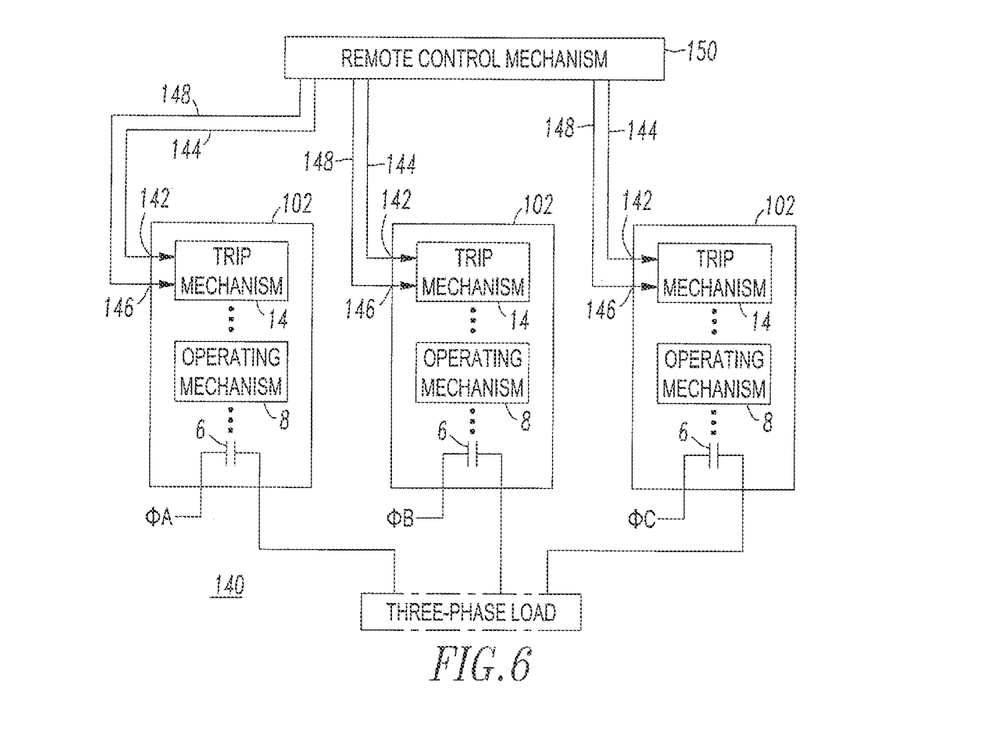

FIG. 6 shows a plural-phase system 140 including a plurality of electrical switching apparatus, each of which can be the remote control circuit breaker 102 of FIG. 4. The trip mechanism 14 (FIG. 1) of the circuit breaker 102 includes a first input 142 for a first remote signal 144 and a second input 146 for a second remote signal 148. A remote control mechanism 150 outputs for each of the remote control circuit breakers 102, the first remote signal 144 ("close/reset") to the first input 142, which are the pins 58 of the solenoid 12, and the second remote signal 148 ("trip open") to the second input 146 of the trip mechanism 14.

As shown, the example system 140 is an example three-phase system including three of the remote control circuit breakers 102. The remote control mechanism 150 outputs three first remote signals 144 in parallel, each of the three first remote signals 144 being for the solenoid pins 58 ("close/reset") of a corresponding one of the three remote control circuit breakers 102, and three second remote signals 148 in parallel, each of the three second remote signals 148 being for the pins 60 ("trip open") of the trip mechanism of the corresponding one of the three remote control circuit breakers 102.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. An electrical switching apparatus comprising:
   a housing;
   separable contacts within said housing;
   an operating mechanism structured to open and close said separable contacts, said operating mechanism comprising a push/pull operating handle and a remotely controllable actuator; and
   a trip mechanism cooperating with said operating mechanism to trip open said separable contacts in response to a trip condition or remotely open said separable contacts when closed,
   wherein the remotely controllable actuator is structured to move the push/pull operating handle in order to remotely close said separable contacts when opened or remotely reset said separable contacts when tripped open, and
   wherein said push/pull operating handle includes a push button with a brass mold insert disposed therewithin that receives a plunger of the remotely controllable actuator to allow the operating mechanism to manually open the separable contacts by a pull of the push button in a direction away from the remotely controllable actuator.

2. The electrical switching apparatus of claim 1 wherein said trip mechanism comprises an arc fault trip mechanism; and wherein said electrical switching apparatus is an arc fault circuit breaker.

3. The electrical switching apparatus of claim 2 wherein said arc fault circuit breaker is an aircraft arc fault circuit breaker.

4. The electrical switching apparatus of claim 1 wherein said electrical switching apparatus is a miniature remote controlled arc fault circuit breaker.

5. The electrical switching apparatus of claim 1 wherein the trip condition is one of a thermal fault condition and an arc fault condition.

6. The electrical switching apparatus of claim 5 wherein said trip mechanism is structured to detect the thermal fault condition or the arc fault condition and cause said operating mechanism to trip open said separable contacts.

7. The electrical switching apparatus of claim 5 wherein said trip mechanism is further structured to indicate if said separable contacts are tripped open responsive to the arc fault condition.

8. The electrical switching apparatus of claim 1 wherein said remotely controllable actuator is a solenoid.

9. The electrical switching apparatus of claim 1 wherein said operating mechanism has a first state when said separable contacts are closed and a second state when said separable contacts are open or tripped open; and wherein said operating mechanism is further structured when said separable contacts are tripped open to be manually reset from the second state to the first state by the push button being pushed toward said remotely controllable actuator.

10. The electrical switching apparatus of claim 1 wherein a mounting bracket is coupled to said remotely controllable actuator and is structured to mount said electrical switching apparatus on a panel.

11. The electrical switching apparatus of claim 1 wherein said trip condition is a thermal overload condition; and wherein said trip mechanism comprises a thermal trip mechanism structured to cooperate with said operating mechanism to trip open said separable contacts responsive to said thermal overload condition.

12. The electrical switching apparatus of claim 11 wherein said operating mechanism has a first state when said separable contacts are closed and a second state when said separable contacts are open or tripped open; and wherein said operating mechanism is further structured when said separable contacts are tripped open to be manually reset from the second state to the first state by said push button being pushed toward said remotely controllable actuator.

13. The electrical switching apparatus of claim 1 wherein said operating mechanism is further structured to be manually opened or closed by the push button or remotely closed by the remotely controllable actuator without the presence of the trip condition.

14. The electrical switching apparatus of claim 1 wherein said operating mechanism is further structured to be manually reset by the push button being pushed toward said remotely controllable actuator.

15. The electrical switching apparatus of claim 1 wherein said remotely controllable actuator extends from said housing; and wherein a panel mounting bracket is coupled to said remotely controllable actuator and is structured to mount said electrical switching apparatus to a panel.

16. The electrical switching apparatus of claim 1 wherein a pair of plug-in members extend from said housing; wherein said separable contacts are electrically connected between said plug-in members; and wherein said plug-in members plug into corresponding plug-in members of a circuit breaker panel or power distribution unit.

17. A plural-phase system comprising:
a plurality of electrical switching apparatus, each of said electrical switching apparatus comprising:
a housing,
separable contacts within said housing,
an operating mechanism structured to open and close said separable contacts, said operating mechanism comprising a push/pull operating handle and a remotely controllable actuator including an input for a first remote signal, and
a trip mechanism cooperating with said operating mechanism to trip open said separable contacts in response to a trip condition or remotely open said separable contacts when closed, said trip mechanism including an input for a second remote signal,
wherein the remotely controllable actuator is structured to move the push/pull operating handle in order to remotely close the separable contacts when opened or remotely reset the separable contacts when tripped open;
a remote control mechanism structured to output for each of said electrical switching apparatus, the first remote signal to the input of the remotely controllable actuator and the second remote signal to the input of the trip mechanism; and wherein said push/pull operating handle includes a push button with a brass mold insert disposed therewithin that receives a plunger of the remotely controllable actuator to allow the operating mechanism to manually open the separable contacts by a pull of the push button in a direction away from the remotely controllable actuator.

18. The plural-phase system of claim 17 wherein said plural-phase system is a three-phase system; wherein said plurality of electrical switching apparatus are three electrical switching apparatus; wherein said remote control mechanism outputs three first remote signals in parallel, each of the three first remote signals being for the input of the remotely controllable actuator of a corresponding one of said three electrical switching apparatus, and three second remote signals in parallel, each of the three second remote signals being for the input of the trip mechanism of the corresponding one of said three electrical switching apparatus.

19. A system comprising:
a power distribution unit or circuit breaker panel; and
an electrical switching apparatus comprising:
a housing,
separable contacts within said housing,
an operating mechanism structured to open and close said separable contacts, said operating mechanism comprising a push/pull operating handle and a remotely controllable actuator, and
a trip mechanism cooperating with said operating mechanism to trip open said separable contacts in response to a trip condition or remotely open said separable contacts when closed,
wherein the remotely controllable actuator is structured to move the push/pull operating handle in order to remotely close said separable contacts when opened or remotely reset said separable contacts when tripped open;
wherein said electrical switching apparatus is a switching contactor for said power distribution unit or a master open/close device for said circuit breaker panel; and
wherein said push/pull operating handle includes a push button with a brass mold insert disposed therewithin that receives a plunger of the remotely controllable actuator to allow the operating mechanism to manually open the separable contacts by a pull of the push button in a direction away from the remotely controllable actuator.

20. The system of claim 19 wherein said trip condition is an arc fault trip condition; wherein said trip mechanism comprises an arc fault trip mechanism; and wherein said electrical switching apparatus is structured to provide arc fault protection for said circuit breaker panel.

* * * * *